Nov. 4, 1947.    F. G. DA ROZA ET AL    2,430,213
CONTROL SYSTEM
Filed Oct. 3, 1942    2 Sheets-Sheet 1

Inventors
Francis G. Da Roza &
Karl Sarafian
By Blackmor, Spencer & Flint
Attorneys Patented Nov. 4, 1947

2,430,213

UNITED STATES PATENT OFFICE 2,430,213

CONTROL SYSTEM

Francis G. da Roza, Ferndale, and Karl Sarafian, Detroit, Mich., assignors to General Motors Corporation, Detroit, Mich., a corporation of Delaware Application October 3, 1942, Serial No. 460,622

9 Claims. (Cl. 171—97)

This invention relates to a control system and more specifically to a control system for means in which it is desirable to control the rate of current application and the mean value of current. As an example, one application in which such a control system has utility is in welding machines wherein it is necessary to very accurately control the number of cycles or half cycles that are applied to produce the weld and also the mean value of the current flowing for these periods. Different materials being welded necessitate a different time or number of cycles and different rates of current input per cycle in order to obtain satisfactory welds. In some cases the material must be heated slowly but a comparatively large amount of current is necessary in toto while in other cases only a relatively small amount is needed and then may be applied in a short time. It is necessary therefore to provide a flexible control system which can be regulated to supply the proper energy at the proper rate for the material being used.

It is therefore an object of our invention to provide a control system for a load which system is capable of adjusting the rate and value of energy application.

It is a further object of our invention to provide a control system for a load unit that may be adjusted to provide varying rates and values of energy application thereto.

It is a still further object of our invention to provide a control system to supply alternate half cycles of different current value to a load.

With these and other objects in view which will become apparent as the specification proceeds, the embodiments of our invention will be best understood by reference to the following specification and claims and the illustrations in the accompanying drawings, in which:

Figure 1:
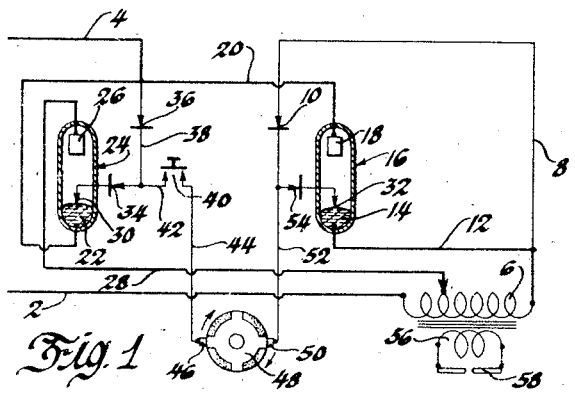
Figure 1 is a schematic wiring diagram of a control system embodying our invention.

Referring now more specifically to the drawings, in Figure 1 there is disclosed a pair of supply lines 2 and 4 across which the necessary voltage is developed. Line 2 is connected to one end of a primary winding 6 of a transformer, the opposite end of which is connected to line 8 which extends to a rectifier unit 10. Connected to line 8 is a line 12 which extends to the mercury contact 14 in a mercury pool tube 16 of the ignitron type. The anode or plate 18 of the ignitron 16 is connected by line 20 to both the incoming line 4 and the mercury electrode 22 of a second ignitron 24. The plate 26 of the ignitron 24 is connected by line 28 to an adjustable tap on the primary coil 6.

Each of the ignitron tubes is of course provided with an igniting or starting electrode as 30 and 32 which when voltage is applied thereto forms a cathode spot on the mercury pool to put the tube in conducting condition and it will then fire if voltage is applied between the plate and cathode of the proper polarity. Igniting electrode 30 of tube 24 is connected to rectifier unit 36 by line 38 and also to one terminal of a switch 40 by line 42, the opposite side of the switch being connected by line 44 to a brush 46 on a commutating element 48 driven by a synchronous motor (not shown). The opposite side of the rectifier 36 is connected to line 4.

The second brush 50 of the commutating element is connected by line 52 to the rectifier unit 10 and also to rectifier unit 54, the latter being also connected to the igniting electrode 32 of the ignitron tube 16. The transformer primary 6 cooperates with a secondary winding 56 to provide power across the welding electrodes 58. While the switch 40 is shown as being manually operated, it will of course be closed by any suitable timing means usually used on welding control apparatus to give the required number of cycles of energization to the material clamped between the electrodes to perform the weld.

It will be noted that each ignitron tube controls the flow of current for an alternate half cycle, and that one tube is connected across the whole of the primary coil 6, while the other is only connected across a portion thereof. Thus when the tube 24 is conducting, a larger current will flow in the secondary 56 than when the tube 16 is conducting and this difference will be substantially proportional to the ratio of the full number of turns to the turns in the tapped portion. It therefore follows that there will flow in the secondary circuit alternate large and small currents. This is graphically illustrated in Figure 2 where the curve E denotes the sinusoidal voltage applied and the small loops $I_{24}$ and $I_{16}$ denote the secondary currents applied by the conductance of the tubes 24 and 16 respectively.

In operation the lines 2 and 4 are connected to a suitable source of power and at the required moment the switch 40 is closed by the timing apparatus. Let it be assumed that for the first half cycle after the switch 40 is closed, the line 4 is positive with respect to line 2. Current will flow through the igniting electrode of tube 16 in the following circuit: line 4, rectifier 36, line 38, line 42, switch 40, line 44, brush 46, commutator 48, brush 50, line 52, rectifier 54, electrode 32, mercury pool 14, line 12, primary 6 to line 2. This will form a cathode spot at the contact point of the igniting electrode 32 and the mercury pool 14. If at this time the polarity of the two main electrodes of the ignitrons 16 are of the satisfactory sign, the tube will then conduct and in this instance that is true since we have assumed that at this point the incoming line 4 is positive. Current will then flow through line 4, line 20, anode 18, cathode 14, line 12, primary coil 6 to line 2. It will be seen that in this instance the whole primary coil 6 is utilized to induce current in the secondary coil 56 and apply potential across the welding electrodes 58.

Figure 2:
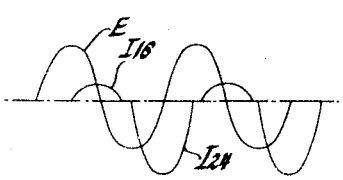
Figure 2 shows the graphic representation of the wave form of current produced by our system.

Referring momentarily to Figure 2, a current $I_{16}$ will be induced in the secondary and flow through the weld. If, however, the polarity of the incoming lines is reversed, as would be true in the next half cycle of alternating current, incoming line 4 would then be negaitve and line 2 positive. In this instance an ignition circuit would be completed as follows: line 2, coil 6, line 8, rectifier 10, line 52, brush 50, commutator 48, brush 46, line 44, switch 40, line 42, rectifier 34, ignition electrode 30, mercury pool 22 to line 4. This again causes a cathode spot in the tube to cause the same to fire. The conductive circuit through the tube 24 is completed as follows: line 2, a portion of the primary 6, line 28, anode 26, mercury pool 22 to line 4.

In this case it will be noted that the current flowing through this circuit only utilizes a portion of the primary coil 6 to induce into the secondary 56 a welding current. This current will of course be considerably larger than that induced when using the whole primary 6 and again referring to Figure 2 momentarily, this current may be represented by $I_{24}$. Therefore, using this system there will be impressed upon the welding circuit alternate current of low and high value, the ratio being dependent upon the position of the tap on the transformer primary. While it will be noted that this unbalance may cause some saturation of the transformer, it will only be used for a short time (a very few cycles) and in most instances will not be undesirable. If it is desired to vary the amount of current introduced by either of the tubes 24 or 16 from the maximum current per cycle obtainable when the tube becomes conductive at the beginning of the cycle, the current may be regulated by adjusting the phase shift commutator mechanism 48 to cut down the current per half cycle and to do this it is only necessary to move the brushes 46 and 50 to different angular positions as indicated by the arrows.

Since the commutator means is connected in each of the ignition circuits, it will thus control the point in the half cycle when the cathode spot is formed to fire the tube and by delaying this point may give any fraction of the half cycle desired. It will be noted however that since it is common to both ignition circuits that each tube will therefore be set at the same delay point per half cycle. If desired of course a pair of commutator units may be used so that the different tubes may be given different degrees of delay.

Figure 3:
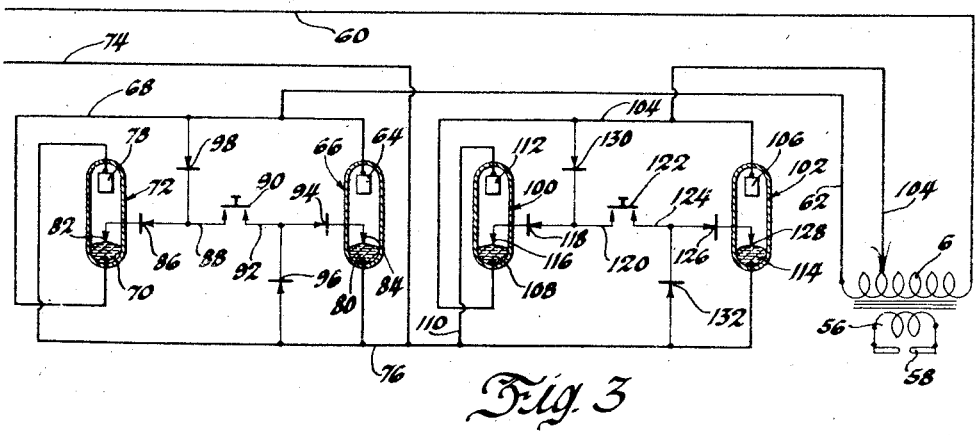
Figure 3 is a schematic wiring diagram of a modified form of control system.

In the system just described, each alternate half cycle has a different value. If, however, it is desired to have several half cycles of the same value and then a small number of half cycles of a higher or lower value, we have provided a system as disclosed in Figure 3 to enable us to obtain this result. In this instance there is provided an incoming line 60 which is connected to one end of the transformer primary 6 which as before cooperates with a secondary 56 connected across a pair of welding electrodes 58. The opposite end of the primary 6 is connected by line 62 to an anode 64 of a mercury discharge tube 66 and also to a line 68 which extends to a mercury cathode 70 of a second mercury discharge tube 72. A second incoming line 74 is connected to line 76 which extends to an anode 78 of the tube 72 and also to the mercury pool 80 of the tube 66.

In each of these mercury discharge or ignitron tubes there is provided an igniting electrode 82 and 84 respectively, the first of which is connected to a rectifier unit 86 which is in turn directly connected by line 88 to a timing or operating switch 90, the opposite side of said switch being connected by line 92 to rectifier unit 94 and thus to the other igniting electrode 84. Connected between line 76 and 92 is a rectifier unit 96 and connected between line 68 and 88 is a further rectifier unit 98. The system thus described controls the current flow to the whole of the primary 6.

There is also provided a further pair of ignitron tubes 100 and 102 for controlling the current through only a portion of the primary 6. From a tap on the primary 6 there extends a line 104 which is connected to the anode 106 of the tube 102 and also the cathode or mercury pool 108 of the tube 100. A line 110 extends from line 76 to anode 112 of the tube 100 and line 76 is directly connected to cathode 114 of the tube 102. An igniting electrode 116 is provided in the tube 100 and connected to a rectifier unit 118 from which a line 120 extends to the switch 122, the opposite side of the switch being connected by line 124 to a further rectifier unit 126 and thus to an igniting electrode 128 in the tube 102. Connected between lines 104 and 120 is a rectifier unit 130 and between lines 76 and 124 a last rectifier unit 132. The switches 90 and 122 are as before controlled by timing means normally utilized for timing welding controls and may be closed for a predetermined number of cycles or half cycles in order to provide the necessary welding current.

Figure 4:
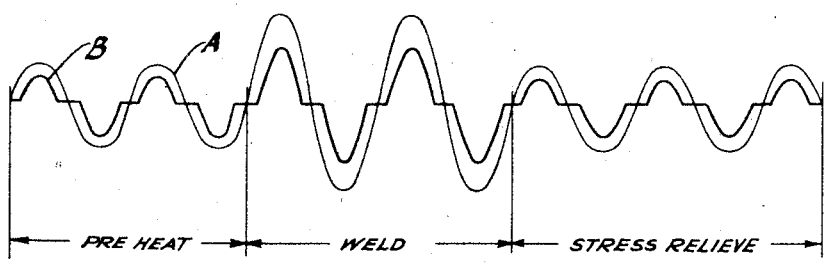
Figure 4 shows the graph of the wave form of current produced by the modified circuit.

Since ignitrons 100 and 102 control the current through only a portion of the primary 6, the current provided to the secondary 56 when these two are placed in operation will be a relatively large one. However, the current through the primary 6 when ignitrons 66 and 72 are in operation will be relatively small. Thus by predetermining the resultant current form which we desire to apply to the material to be welded, we can determine how and when we weld the various units. Assuming that it is desirable to apply a small amount of heat to initially bring the material to be welded to a relatively high temperature without welding, and that then it is desirable to apply the welding current, and thereafter to apply a low current again in order to relieve any mechanical stress introduced into the heated bodies, we can apply a resultant wave form as indicated in Figure 4 in which we apply current through the whole of the primary 6 for four half cycles and to do so the timing means closes the switch 90. This switch is then opened and switch 122 closed for four half cycles which will introduce the current through the tapped portion of the primary 6.

Switch 122 is then opened and switch 90 is then closed to again apply the smaller input and we will have the desired result. Any other combination of current values may of course be obtained.

Assuming, therefore, that switch 90 is first closed, an igniting circuit will be completed to the tube 66 if we consider at the moment that line 60 is positive. Such ignition system is as follows: line 60, primary coil 6, line 62, rectifier unit 98, line 88, switch 90, line 92, rectifier 94, ignition electrode 84, mercury pool 80, line 76 to incoming line 74. Again a cathode spot will be formed to fire the tube if the polarity is correct, which in this instance it is, and the current will flow conductively through the tube and primary coil in the following circuit: line 60, primary 6, line 62, line 68, anode 64, cathode 80, line 76 to the opposite line 74. In the opposite half cycle the tube 72 will fire through a similar circuit and it is not deemed necessary to trace. Thus as long as the switch 90 is closed, current will be provided to the secondary from the whole of the primary, the tubes 72 and 66 firing alternately in half cycle intervals. This would cover the period in Figure 4 labeled "Pre-heat."

When a sufficient amount of heat has thus been applied, the switch 90 will be open and switch 122 will be closed and when that is closed ignitrons 102 and 100 will alternately be energized to conduct current and in this instance the tapped portion of the primary 6 will be utilized to induce current in the secondary and to provide sufficient welding current across the electrodes 58. This is indicated in Figure 4 in that portion of the curve labeled "Weld." Thereafter switch 122 may be opened and 90 again closed to provide a lower current for stress relief. Of course, any combination of high and low values of current may be obtained as desired. The substantially sinusoidal curve marked "A" in Figure 4 illustrates the current value without any phase shift or commutator adjustment as shown at 48 in Figure 1 and the curve labeled "B" illustrates the current form when the current has been phase shifted with the use of such a device to illustrate the difference in the average amount of current applied.

Figure 5:
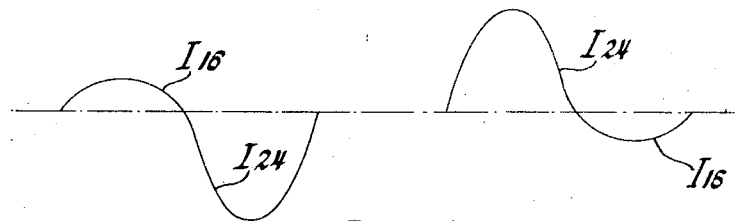
Figures 5-8 inclusive show various current wave combinations that are obtainable with our control systems.
Figure 6:
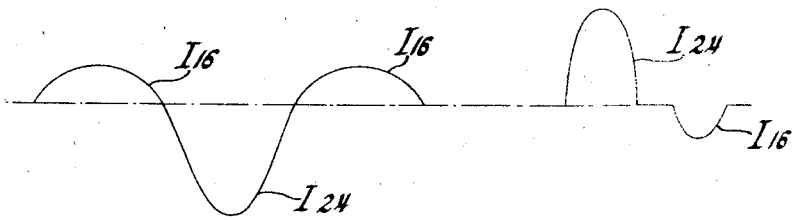
Figure 7:
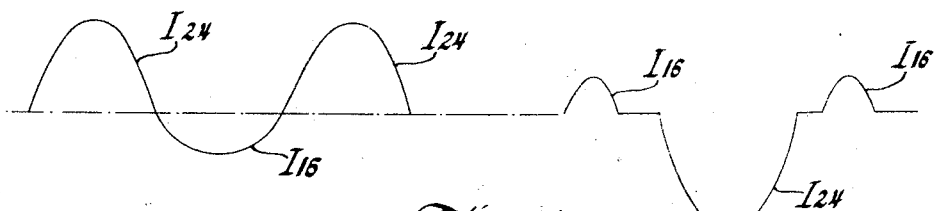
Figure 8:
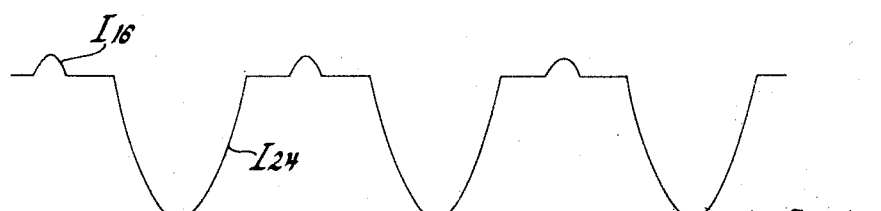

Figures 5, 6, and 7 illustrate different combinations of high and low values of current obtainable with the disclosure of Figure 1. Referring to Figure 5 specifically, there is shown therein first the current applied to the secondary when the tubes 16 and 24 fire in that order and we obtain first a relatively low current and then a relatively high one, as indicated at $I_{16}$ and $I_{24}$, and it will be noted in this instance there is no phase shifting applied. The second portion of Figure 5 shows the reverse of this condition where the 24 fires first. The first portion of Figure 6 shows three half cycles similar to Figure 5 in which the tube 16 fires first and last. The last portion of Figure 6 shows the application of phase shifting to this system to utilize only a portion of each current wave. Since the phase shifter is shown as common to both tubes, it will of course delay the firing of each an equal amount and therefore the current will be cut down proportionally in each case. Figure 7 of course in the first portion thereof discloses the reverse of the first portion of Figure 6, that is, with the tube 24 firing first and last and the tube 16 firing in the intermediate half cycle. The second portion of Figure 7 illustrates the use of phase shifting on the current wave shown in the first portion of Figure 6. Figure 8 discloses the result obtainable if the phase shift was only applied to the smaller current control, that is, to the tube 16 and no phase shift applied to the tube 24. This might be desirable under certain circumstances.

It will thus be obvious that we have provided a very flexible control system for applying various amounts of currents at different rates to materials to be welded and since it is so flexible can be applied to the welding of various materials hereinbefore believed to be difficult to weld satisfactorily.

We claim:

1. In a control system, a source of alternating current, a power consuming load, a transformer having a primary and a secondary coil, the latter being connected to the load, a tap on the primary of the transformer, and means connected to the primary and the tap and to the source to alternately energize the full primary and the tapped section to periodically vary the amount of current delivered to the secondary and to the load.

2. In a control system, a source of alternating current, a power consuming load, a transformer having a tapped primary and a secondary coil, the latter being connected to the load, a plurality of arc discharge devices connected between the source and the transformer primary and means to control the initiation of current flow through the devices whereby the flow through the transformer to the load is controlled.

3. In a control system, a source of alternating current, a power consuming load, a transformer having a tapped primary and a secondary coil, the secondary being connected to the load, arc discharge means connected to the full transformer primary and also to the tapped portion and means to cause said discharge devices to become conductive alternately and thus provide a periodically varying current to the load.

4. In a control system, a source of alternating current, a power consuming load, a transformer having a tapped primary and a secondary coil, the secondary being connected to the load, arc discharge means connected to the full transformer primary and also to the tapped portion and adjustable means to cause said discharge devices to become conductive alternately and thus provide a periodically varying current to the load.

5. In a control system, a source of alternating current, a power consuming load, means to alternately supply different current values to the load and a plurality of arc discharge devices connected to the source and to and controlling the energization of the last named means.

6. In a control system, a source of alternating current, a power consuming load, a transformer having a tapped primary and a secondary coil, the latter being connected to the load, a pair of arc discharge devices conductive only in one direction connected in inverse relation to the source of current, one of said devices being connected to one terminal of the primary and the other to the primary tap whereby they alternately control the energization of the full or part of the primary winding upon successive half cycles.

7. In a control system, a source of alternating current, a power consuming load, a transformer having a tapped primary and a secondary coil, the latter being connected to the load, a pair of arc discharge devices conductive only in one direction connected in inverse relation to the source of current, one of said devices being connected to one terminal of the primary and the other to the primary tap whereby they alternately control the energization of the full or part of the primary winding upon successive half cycles, and means for adjustably controlling the conductivity of said devices.

8. In a control system, a source of alternating current, a power consuming load, a transformer having a tapped primary and a secondary, the latter being connected across the load, a pair of arc discharge devices conductive in only one direction connected in parallel and inverse relation between the source and one terminal of the transformer primary, a second pair of arc discharge devices in parallel and inverse relation between the source and the primary tap and switching means to control the conductive periods of the discharge devices and thus the power delivered to the load.

9. In a control system, a source of alternating current, a power consuming load, inductive means connected to said load, a plurality of circuits each interconnecting said source and different portions of said inductive means to supply currents of different values to said load, control means in each of the circuits including an arc discharge device to act as a rectifying switch in response to different cyclic current variations of the source to control periods of energization of each circuit and synchronous switching means in circuit between the discharge devices and the source for varying the conductive periods of the arc discharge device.

FRANCIS G. DA ROZA.
KARL SARAFIAN.

REFERENCES CITED

The following references are of record in the file of this patent:

UNITED STATES PATENTS

| Number | Name | Date |
| --- | --- | --- |
| 2,178,827 | Bowie | Nov. 7, 1939 |
| 2,233,177 | Murray et al. | Feb. 25, 1941 |